UNITED STATES PATENT OFFICE.

WINFIELD BURROWS SIFTON, OF WESTMINSTER, LONDON, ENGLAND.

PROCESS FOR THE PRODUCTION OF TOLUENE.

1,216,174.  Specification of Letters Patent.  Patented Feb. 13, 1917.

No Drawing.  Application filed July 20, 1915. Serial No. 40,953.

*To all whom it may concern:*

Be it known that I, WINFIELD BURROWS SIFTON, captain in the Canadian Army, residing at 34 Victoria street, Westminster, in the county of London, England, have invented a new and useful Process for the Production of Toluene, of which the following is a specification.

This process refers to the production of toluene from benzene.

It is a well known fact and has been known for many years that methylated compounds of benzol or benzene can be obtained by the Friedel-Crafts reaction with the assistance of anhydrous aluminium chlorid, but the entire chemical literature describes the further transformation of the toluene formed into higher homologues containing two or more methyl groups in place of the only one required for the production of toluene.

If, according to the prescription of the reaction by Friedel-Crafts, the temperature of the benzene is kept at or near the boiling temperature of the same (83° C.) it will be found after stopping the reaction that the benzene, after washing, contains some toluene and a considerable large quantity of higher compounds that are of no value for the purposes of this invention.

I have found that the reaction of methyl chlorid on benzene in the presence of anhydrous aluminium chlorid and iron turnings slowly begins at ordinary temperature and rises to a maximum result at between 45° to 55° C. and decreases with rising temperature in the percentage of toluene produced by transforming the same into the higher methylated compounds.

We have found in practice that the yield of toluene at a temperature of 50° C. is 97½% of the theoretical yield, and that the highest yield obtained at a temperature of 80° C. is 12%, the process at the latter temperature having been previously suggested.

The reaction of my process is based upon the following formula:—

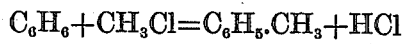

$$C_6H_6 + CH_3Cl = C_6H_5.CH_3 + HCl$$

The process is carried into effect by charging two or more vessels with benzene and anhydrous aluminium chlorid in the proportion of 5 parts of the former to one part of the latter. Within the vessels is also placed a quantity of iron turnings to serve as a catalytic agent. The vessels are now heated by any suitable means, such as by steam, and when the mixture has reached a temperature of about 50° C. methyl chlorid gas is passed through the vessels successively until the conversion of the benzene is completed, the temperature being maintained throughout the operation at about 50° C., but not exceeding 55° C. When the conversion of the benzene in the first vessel has reached its maximum this vessel is removed and after being re-charged is replaced as the last of the series of vessels containing benzene under treatment. Each vessel of the series of vessels is successively treated in a like manner so that when recharged it becomes the last of the series.

From the last vessel in the series of vessels the hydrochloric acid formed by the reaction in the vessels is withdrawn and pumped into a vessel containing methyl alcohol and fused zinc chlorid, thereby producing methyl chlorid. The temperature of the methyl alcohol, which is heated in said vessel, should be kept well below its boiling point, and the vessel is preferably provided with a reflux condenser to condense any methyl alcohol which may pass over. The methyl chlorid which has been generated is passed through suitable drying apparatus to remove all traces of moisture and is then pumped into the vessels containing the mixture of benzene and aluminium chlorid.

From the foregoing description it will be seen that the process is continuous, as the hydrochloric acid produced in the benzene converters is utilized for the production of methyl chlorid which is employed for converting the benzene into toluene.

What I claim as my invention and desire to secure by Letters Patent, is:—

1. The herein described process for the production of toluene, consisting in passing methyl chlorid through benzene heated in the presence of anhydrous aluminium chlorid and a catalytic agent to a temperature between 45° to 55° C.

2. The herein described process for the production of toluene, consisting in passing methyl chlorid through benzene heated in the presence of anhydrous aluminium chlorid and iron turnings to a temperature between 45° to 55° C.

WINFIELD BURROWS SIFTON.